No. 710,254. Patented Sept. 30, 1902.
J. H. COOPER.
VEHICLE AXLE.
(Application filed May 31, 1902.)
(No Model.)

Witnesses,  Inventor,
E. S. Brandau,  John H. Cooper
J. H. Nurse  By Dewey Strong & Co.
  att'y

UNITED STATES PATENT OFFICE.

JOHN H. COOPER, OF MADERA, CALIFORNIA, ASSIGNOR OF ONE-HALF TO LEVI WILSON, OF MERCED, CALIFORNIA.

VEHICLE-AXLE.

SPECIFICATION forming part of Letters Patent No. 710,254, dated September 30, 1902.

Application filed May 31, 1902. Serial No. 109,682. (No model.)

*To all whom it may concern:*

Be it known that I, JOHN H. COOPER, a citizen of the United States, residing at Madera, county of Madera, State of California, have invented an Improvement in Vehicle-Axles; and I hereby declare the following to be a full, clear, and exact description of the same.

My invention relates to improvements in vehicle-axles.

It consists, essentially, in the formation of the axle with removable ends or "stubs," as they are called, and means for renewing these stubs and the spindles carried thereby whenever they are worn without the expense of cutting off and welding new ones upon the main portion of the axle.

My invention also comprises means for maintaining a close-running joint between the spindles and the hub-boxes of the wheels and to compensate for any wear which would cause end play.

It also comprises details of construction, which will be more fully explained by reference to the accompanying drawings, in which—

Figure 1:
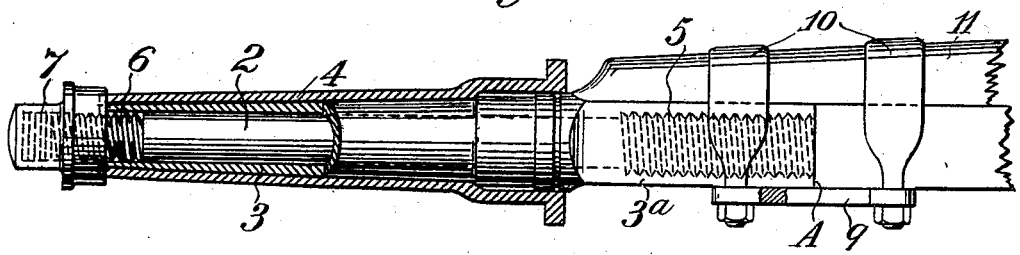
Figure 2:
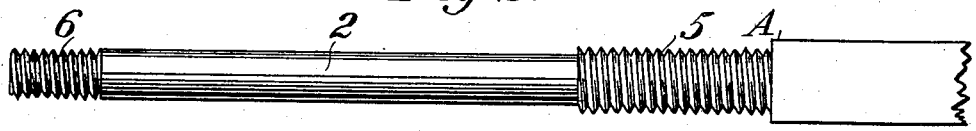
Figure 3:
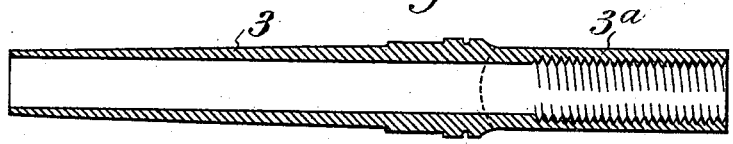
Figure 4:
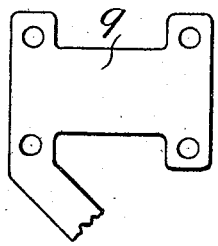

Figure 1 is part longitudinal elevation and part section embodying my invention. Fig. 2 is an elevation of the inner spindle. Fig. 3 is a longitudinal section of the outer spindle. Fig. 4 is a plan of the clip-yoke.

In the manufacture of vehicle-axles the main or central portion of the axle is commercially made separate from the ends or "stubs," as they are called, carrying the spindles upon which the wheels turn. These ends or stubs have a sufficient portion interior to the spindle so that they can be welded upon the central part of the axle whenever desired. The cost of thus welding these stubs upon the axle for a set of wheels is considerable, and whenever the spindles become worn it is necessary to cut them off and to weld on new ones, making the same expense over again in addition to the taking of the vehicle to pieces.

It is the object of my invention to so construct the spindle and stub that when the stubs have once been welded upon the main portion of the axle the spindles can, when worn out, be replaced without again cutting the axles and at a comparatively small expense.

As shown in the accompanying drawings, A represents the stub or part which is welded to the main portion of the axle, which is usually made square, and in my invention an inner spindle 2 is made as a continuation and of sufficiently smaller diameter to allow the main or outer spindle 3 to be fitted upon it, and the wheel-hub box 4 fits and turns upon this outer spindle. The inner spindle or extension of the stub A has a threaded portion 5 at its inner end, and the outer end is threaded, as at 6, to receive the nut 7, by which the wheel is kept in place. The outer spindle 3 is made hollow and has a square extension, as at 3ª, corresponding in size and shape with the axle A. The interior of this extension is screw-threaded to fit the threads 5 of the inner spindle, and this outer part is screwed upon the inner threaded portion until it abuts against the part A, with the outer hollow spindle 3 fitting closely over the inner spindle 2. In this condition the axle is complete, and the threaded end 6 of the inner spindle projects beyond the end of the tubular outer one 3 sufficiently to receive the nut 7, which is applied after the wheel is in place upon the axle.

The wheel contains the usual hub-box, which fits the spindle 3 in all respects similar to the fitting of such boxes upon the spindles when the latter are made solid.

The inner end of the nut 7 is chambered and adapted to receive a number of leather, fiber, or other suitable washers to prevent end play. The wear which takes place by reason of the friction between the end of the hub-box and the nut will after a while shorten the box so that there will be considerable end play, which can not always be satisfactorily taken up by washers.

In my invention it is only necessary to remove the tubular spindle 3 from the inner one by unscrewing it and then file off the end of the spindle enough to bring it even with the end of the hub-box. Then by a change in the number of washers within the nut the latter may be adjusted so that there will be a close-running joint, and the end play will all be taken up.

In order to strengthen the connection where the hollow portion 3ª of the stub screws upon the threads 5, I have shown a clip-yoke 9, which is made as shown, extending beneath the joint where the two parts A and 3ª abut.

Projections or lugs at each end extend out upon each side below the axle and have holes made through them to admit the threaded ends of the clips 10. The clips pass over the wooden upper portion 11 of the axle, one passing through the holes of the clip-yoke beneath the part A and the other passing through the holes in the yoke beneath the part 3ª. When these are securely screwed down, the joint is strengthened by the clip-yoke 9, which crosses it, and this clip-yoke also prevents the unscrewing of the part 3ª and the spindle carried by it.

The usual braces may be connected with the clip-yoke, extending from thence to the reach or other part in the usual manner.

Having thus described my invention, what I claim, and desire to secure by Letters Patent, is—

1. The combination with an axle, of stubs having cylindrical extensions with screw-threads at the inner portions, and a tubular spindle fitting over each of the said extensions and having substantially square extensions at the inner end corresponding approximately in shape with the axle, said square extensions being internally threaded to engage the threads at the inner end of the tubular extension of the stub.

2. The combination with an axle, of a stub having a cylindrical extension provided, at the inner end, with screw-threads; a tubular sleeve extending the length of, and fitting over, the cylindrical extension, and having a square extension at the inner end fitting over the threaded portion of the cylindrical extension and internally threaded to engage the latter, means for clamping said extension of the sleeve and the stub to a main portion of the axle, and a nut upon the outer end of the cylindrical extension for retaining the wheel in place.

3. The combination in a wheel-axle of the stub having a cylindrical extension, a sleeve or spindle fitting said extension forming a bearing upon which the wheel-hub box turns, said cylindrical extension having a threaded portion at its inner end and said sleeve having a square extension at its inner end internally threaded to engage the threads of the cylindrical extension, and means clamping the squared end of the sleeve extension to a main part of the axle, said cylindrical extension having threads upon its outer end, and a chambered nut fitting upon said threads adapted to contain washers whereby compensation for wear is effected.

4. The combination in a vehicle-axle of a stub having a cylindrical screw-threaded extension, a tubular sleeve or spindle fitting over said extension having the inner end screw-threaded to fit corresponding threads of the stub whereby the two parts are united with the rectangular portions of the axle coincident, a clip-plate extending across beneath the joint of the two having lugs at each end, and clips fitting over the two parts of the axle adjacent to the joint whereby the latter is locked and strengthened.

In witness whereof I have hereunto set my hand.

JOHN H. COOPER.

Witnesses:
S. H. NOURSE,
JESSIE C. BRODIE.